UNITED STATES PATENT OFFICE.

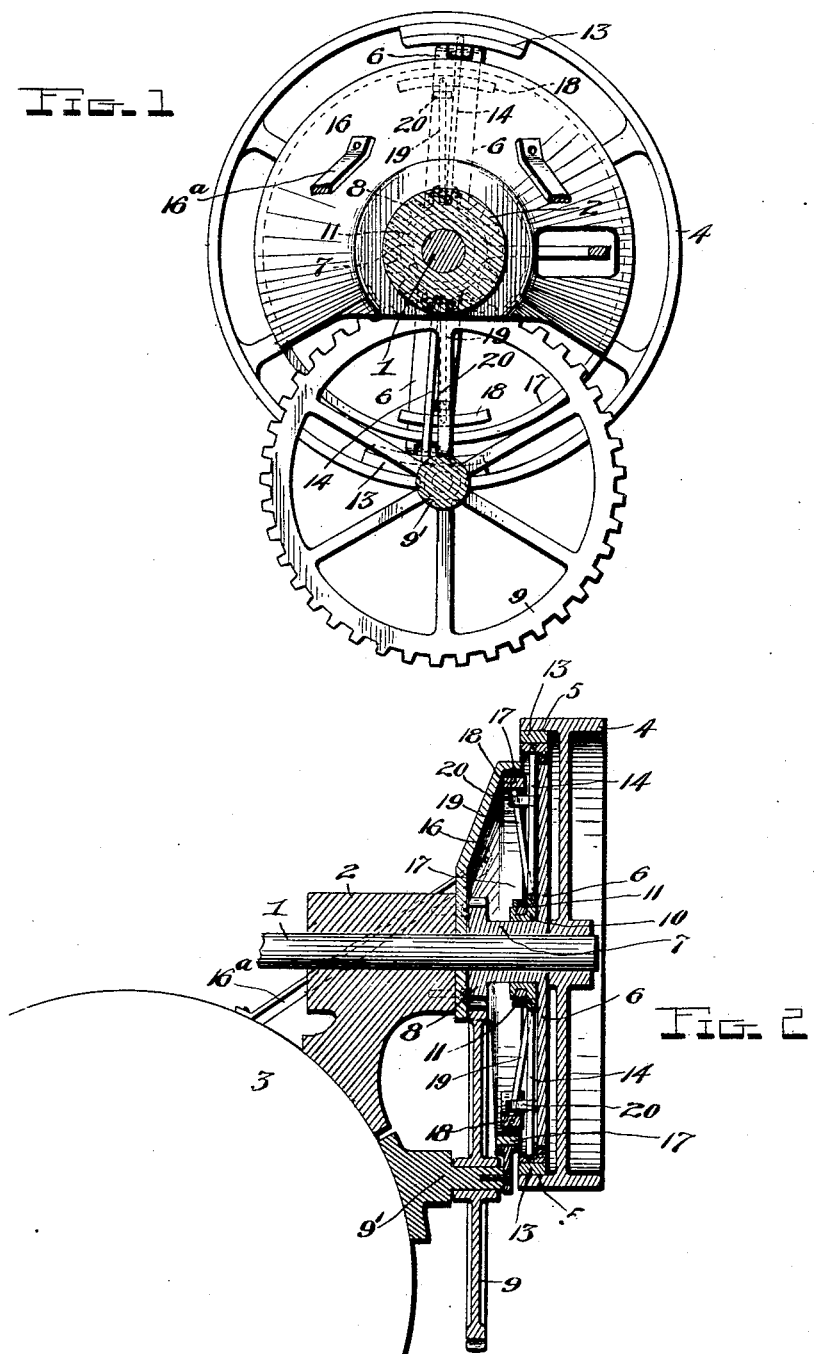

EDWARD DOERSCHLEN, OF DWYER, MISSOURI.

BRAKE FOR TRACTION-ENGINES.

SPECIFICATION forming part of Letters Patent No. 713,408, dated November 11, 1902.

Application filed April 24, 1902. Serial No. 104,522. (No model.)

*To all whom it may concern:*

Be it known that I, EDWARD DOERSCHLEN, a citizen of the United States, residing at Dwyer, in the county of St. Louis and State of Missouri, have invented certain new and useful Improvements in Brakes for Traction-Engines; and I do declare the following to be a full, clear, and exact description of the invention, such as will enable others skilled in the art to which it appertains to make and use the same.

This invention relates to a brake for use in connection with the clutch mechanism of traction-engines to effect the quick and positive stoppage of the gearing and engine when the clutch mechanism is shifted to throw the gearing out of operation.

The object of the invention is to provide a simple and effective brake device which is operated automatically with the clutch and which is readily applicable to any of the forms of the clutches now in common use.

With this and other objects in view, which will readily appear as the nature of the invention is better understood, said invention consists in certain novel features of construction and combination and arrangement of parts, which will be hereinafter fully described, defined in the appended claim, and illustrated in the accompanying drawings, in which—

Figure 1 is a rear elevation of the clutch and brake mechanism. Fig. 2 is a vertical central section of the same.

Referring now more particularly to the drawings, the numeral 1 represents the fly-wheel shaft of the engine, which is journaled at one end in a bearing-bracket 2, secured to the boiler 3, and carries the fly-wheel 4, having a friction-surface 5. Mounted on the shaft adjacent to the fly-wheel is a clutch-wheel 6, feathered to the shaft to turn therewith and slide longitudinally thereon and provided with a hub or collar 7, carrying a pinion 8, meshing with an idle gear-wheel 9, turning on a bearing-bracket 9', secured to the boiler. Sliding on said hub is a grooved sleeve or collar 10, which receives a fork or ring 11, adapted to be connected to a suitable shifting lever. (Not shown.) Connecting between the collar 10 and pivoted members 13 on the spokes or periphery of the clutch-wheel are toggle-links 14, which when the collar 10 is slid inwardly straighten out or expand and force the clutch-blocks 13 against the friction-surface 5, thereby connecting the clutch-wheel to turn with the fly-wheel and its shaft and to transfer motion to the gearing of the engine. (Not shown.)

The foregoing parts constitute a well-known arrangement and construction of fly-wheel and shaft and a clutch device in common use therewith for throwing the gearing of the engine into and out of use.

In carrying my invention into practice I provide a brake member 16, which is suitably fastened to the bracket 2 and is also adapted to be secured to some fixed part of the engine by braces 16ª. The brake member 16 is formed or provided with a friction-surface 17, adapted to be engaged by friction blocks or shoes 18 on a second set of arms or toggle-links 19. These links slide at their outer ends in guides 20, fixed to the clutch-wheel 6, and are pivotally connected at their inner ends to the collar 10. By this construction when the collar 10 is shifted inwardly to clutch the brake member 16 the links 19, which are normally inclined, straighten out and bring the shoes 18 into frictional engagement with the friction-surface 17 of the member 16, thereby arresting the motion of the gearing, so that the engine will be brought to a quick stop. When the clutch is shifted in the opposite direction or outwardly, the two sets of links resume their normal positions, and the brake-blocks are withdrawn to release the fly-wheel and clutch, as will be readily understood.

From the foregoing description, taken in connection with the accompanying drawings, the construction, mode of operation, and advantages of my improved brake will be readily apparent, it is thought, without requiring a more extended explanation.

Various changes in the form, proportion, and the minor details of construction may be resorted to without departing from the principle or sacrificing any of the advantages of this invention.

Having thus described the invention, what is claimed, and desired to be secured by Letters Patent, is—

In a braking attachment for use in connection with the clutch mechanism of engines to stop the gearing when said gearing is thrown out of operation, the combination with a fly-wheel shaft and fly-wheel; of a braking device fixed with relation to the fly-wheel, a friction-clutch feathered to the shaft, a set of expansible links carried by the clutch and provided with shoes to engage a friction-surface of the fly-wheel, and a second set of expansion-links carried by the clutch and provided with shoes adapted to engage a friction-surface of the brake device, substantially as and for the purpose described.

In testimony whereof I have hereunto set my hand in presence of two subscribing witnesses.

EDWARD DOERSCHLEN.

Witnesses:
 J. M. BERRY,
 JOHN GRUENINGER, Jr.